US012510232B1

(12) United States Patent
He

(10) Patent No.: US 12,510,232 B1
(45) Date of Patent: Dec. 30, 2025

(54) LED METEOR LIGHT FOR 360-DEGREE ILLUMINATION AND METHOD THEREFOR

(71) Applicant: Shangyou Jiayi Lighting Product Co., LTD., Jiangxi (CN)

(72) Inventor: Yaowen He, Jiangxi (CN)

(73) Assignee: Shangyou Jiayi Lighting Product Co., LTD., Ganzhou (CN)

( * ) Notice: Subject to any disclaimer, the term of this patent is extended or adjusted under 35 U.S.C. 154(b) by 0 days.

(21) Appl. No.: 19/003,250

(22) Filed: Dec. 27, 2024

(30) Foreign Application Priority Data

Jun. 21, 2024 (CN) ......................... 202410809989.4

(51) Int. Cl.

| | |
|---|---|
| ***F21V 19/00*** | (2006.01) |
| ***F21V 31/00*** | (2006.01) |
| *F21W 121/00* | (2006.01) |
| *F21Y 115/10* | (2016.01) |

(52) U.S. Cl.
CPC .......... *F21V 19/0025* (2013.01); *F21V 31/00* (2013.01); *F21W 2121/008* (2013.01); *F21Y 2115/10* (2016.08)

(58) Field of Classification Search
CPC .... F21V 19/0025; F21V 31/00; F21V 19/002; F21V 19/0015; F21V 19/001; F21V 19/0075; F21V 19/008; F21V 19/0085; F21V 31/005; F21Y 2115/10; F21W 2121/008
See application file for complete search history.

(56) References Cited

U.S. PATENT DOCUMENTS

| | | | | |
|---|---|---|---|---|
| 4,020,337 A * | 4/1977 | Chatten | F21S 4/20 | 362/234 |
| 4,607,317 A * | 8/1986 | Lin | F21V 23/06 | 362/225 |
| 6,394,623 B1 * | 5/2002 | Tsui | F21S 4/26 | 362/249.16 |

* cited by examiner

*Primary Examiner* — Bao Q Truong

(57) ABSTRACT

An LED meteor light for 360-degree illumination and a method therefor. The LED meteor light includes a plurality of LED meteor light units. Each LED meteor light unit is free of a PCB but includes a hood body. A first bare conducting wire with certain rigidity and a second bare conducting wire with certain rigidity, parallel to each other, are at least arranged inside the hood body. A plurality of LED luminous bodies are arranged in sequence inside the hood body along a direction of the first bare conducting wire with certain rigidity and the second bare conducting wire with certain rigidity. Each LED luminous body is connected to the two bare conducting wires through a first connecting wire and a second connecting wire. The present disclosure facilitates 360-degree illumination without a PCB.

10 Claims, 4 Drawing Sheets

LED METEOR LIGHT FOR 360-DEGREE ILLUMINATION AND METHOD THEREFOR

CROSS-REFERENCE TO RELATED APPLICATION

This application claims priority from the Chinese patent application 2024108099894 filed Jun. 21, 2024, the content of which is incorporated herein in the entirety by reference.

TECHNICAL FIELD

The present disclosure relates to the field of LED lamps, in particular to an LED meteor light for 360-degree illumination and a method therefor.

BACKGROUND

A meteor light, also known as a meteor shower light, is an ambient light that creates a unique visual effect. Through special design and technology, it simulates the sight of meteors streaking across the night sky in nature, creating a romantic and dreamy atmosphere for viewers. These types of lights are commonly used in yard decorations, festive events, interior design, and other areas to enhance the aesthetics and add a touch of amusement to the environment.

Meteor lights typically utilize LED light sources mounted on rigid PCBs (printed circuit boards) and are programmed and controlled through built-in integrated circuit (IC) chips. These LED beads light up and extinguish in a specific sequence and speed, forming a continuous flowing pattern of light spots, mimicking the dynamic effect of meteors streaking by.

Designed for easy suspension, meteor lights are suitable for being hung on tree branches, eaves, or other supporting structures. Through flexible connection methods, they can be arranged according to the actual environment layout to create a continuous flowing light strip effect.

Meteor lights are not limited to white light sources; they can also be colorful, supporting various flashing modes and color changes. Users can customize settings based on personal preferences or application scenarios.

However, meteor lights in the prior art predominantly feature single-sided illumination due to the use of PCBs, making it challenging to achieve 360-degree illumination. Even with a few utilizing double-sided LED attachment on PCBs, the area occupied by the PCB still hinders achieving 360-degree illumination.

In view of this, a new LED meteor light needs to be developed to solve the above technical problems.

SUMMARY

In view of this, the present disclosure provides an LED meteor light for 360-degree illumination, wherein the LED meteor light is a point control LED meteor light, and includes a plurality of LED meteor light units, wherein each LED meteor light unit includes a transparent or semi-transparent tubular hood body, each LED meteor light unit is free of a PCB, a head part and a tail part of each hood body includes a first waterproof cap and a second waterproof cap respectively, a first bare conducting wire with certain rigidity and a second bare conducting wire with certain rigidity, parallel to each other, are at least arranged inside the hood body along a direction from the tail part to the head part of the hood body, and a plurality of LED luminous bodies are arranged in sequence inside the hood body along a direction of the first bare conducting wire with certain rigidity and the second bare conducting wire with certain rigidity, wherein each LED luminous body is connected to a first connecting wire and a second connecting wire, the first connecting wire is connected to the first bare conducting wire with certain rigidity, and the second connecting wire is connected to the second bare conducting wire with certain rigidity.

Preferably, each LED luminous body includes an LED bead, and the LED bead is a point control bead and operation of the LED bead is controlled by at least two pins.

Preferably, the first bare conducting wire with certain rigidity and the second bare conducting wire with certain rigidity are in roughly equal lengths.

Preferably, when the LED bead is a two-wire point control bead, the inside of the hood body is provided with merely the first bare conducting wire with certain rigidity and the second bare conducting wire with certain rigidity.

Preferably, when the LED bead is a three-wire point control bead, a third conducting wire is further arranged inside the hood body, wherein the third conducting wire is smaller in wire diameter than the first bare conducting wire with certain rigidity or the second bare conducting wire with certain rigidity.

Preferably, a wire diameter of the third conducting wire is determined on a basis of no significant impact on a visual effect of the corresponding LED meteor light unit and 360-degree illumination of the corresponding LED meteor light unit.

Preferably, the third conducting wire is located between the first bare conducting wire with certain rigidity and the second bare conducting wire with certain rigidity.

Preferably, the first bare conducting wire with certain rigidity and the second bare conducting wire with certain rigidity are power supply wires.

Preferably, the third conducting wire is a signal wire, configured to transmit a signal to the bead in each LED luminous body to control a working status of the bead.

Preferably, the LED beads are in-line beads.

In addition, the present disclosure further discloses a manufacturing method for an LED meteor light for 360-degree illumination. The method includes the following steps:

arranging a first bare conducting wire with certain rigidity and a second bare conducting wire with certain rigidity which are parallel to each other;

arranging a plurality of LED luminous bodies in sequence along a direction of the first bare conducting wire with certain rigidity and the second bare conducting wire with certain rigidity, and connecting each LED luminous body to the first bare conducting wire with certain rigidity through a first connecting wire, and connecting each LED luminous body to the second bare conducting wire with certain rigidity through a second connecting wire.

Preferably, the method further includes the following steps:

arranging a hood body, and sleeving the plurality of LED luminous bodies, the first bare conducting wire with certain rigidity, the second bare conducting wire with certain rigidity, the first connecting wire and the second connecting wire with the hood body.

Preferably, the method further includes the following steps:

arranging a first waterproof cap and a second waterproof cap on a head part and a tail part of the hood body respectively.

Preferably, the method further includes the following steps:

connecting the first bare conducting wire with certain rigidity and the second bare conducting wire with certain rigidity inside the hood body to two power supply wires outside the hood body through the second waterproof cap on the tail part of the hood body.

Preferably, the method further includes the following steps:

when the LED bead is a three-wire point control bead, arranging a third conducting wire inside the hood body, wherein the third conducting wire is smaller in wire diameter than the first bare conducting wire with certain rigidity or the second bare conducting wire with certain rigidity.

The third conducting wire is a signal wire, configured to transmit a signal to the bead in each LED luminous body to control a working status of the bead.

In summary, the present disclosure has the following characteristics:

the LED meteor light disclosed by the present disclosure is free of any PCB, that is, the LED meteor light facilitates 360-degree illumination without a PCB. Further, all necessary circuit elements are sealed inside the LED luminous bodies or beads, which prevents failures caused by the PCB, such as soldering shorts or false soldering, thus realizing a better structural design of the LED meteor light. In addition, according to the manufacturing method for the LED meteor light disclosed by the present disclosure, because PCB soldering is not needed, the problems of short circuits or false soldering in a soldering process are significantly reduced.

BRIEF DESCRIPTION OF DRAWINGS

In order to provide a clearer description of the technical solutions in the embodiments of the present disclosure, a brief introduction will be provided below regarding the accompanying drawings used in the embodiments. It should be understood that the following accompanying drawings are merely illustrative of certain embodiments of the present disclosure and should not be considered as limiting the scope thereof. Those skilled in the art will appreciate that, without exercising inventive effort, other relevant accompanying drawings can be obtained based on these accompanying drawings.

Figure 1:
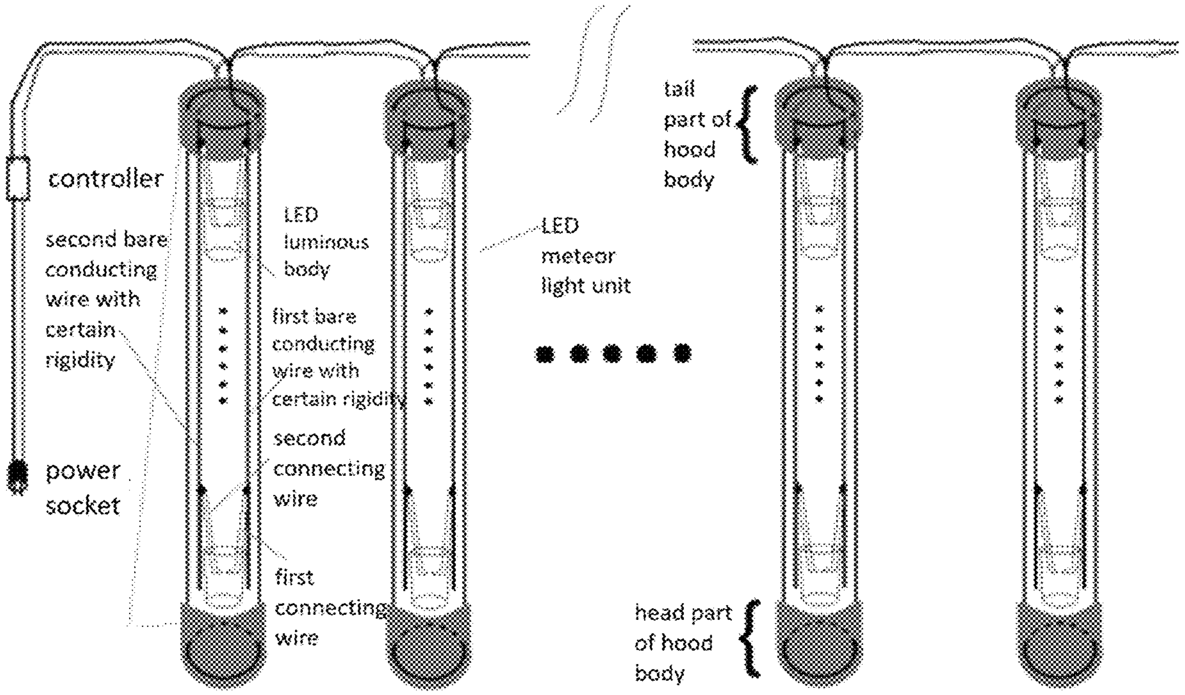
FIG. 1 is a schematic diagram of a two-wire point control LED meteor light provided by an embodiment of the present disclosure.

It should be noted that the above accompanying drawings do not limit the dimensional ratios of lines, beads, various ICs and other parts to each other. The accompanying drawings are more illustrative of the structure, connection relationships, spatial position relationships, etc.

DETAILED DESCRIPTION OF THE INVENTION

In order to make objectives, technical solutions and advantages of embodiments of the present disclosure clearer, the technical solutions in the embodiments of the present disclosure will be described clearly and comprehensively in conjunction with FIG. 1 to FIG. 4 in the embodiments of the present disclosure. It is evident that the described embodiments are only a part of the embodiments of the present disclosure, rather than all the embodiments. Components of the embodiments of the present disclosure described and illustrated in the accompanying drawings can be arranged and designed in various configurations.

Therefore, the detailed description provided below with respect to the embodiments of the present disclosure shown in the accompanying drawings is not intended to limit the scope of the claimed disclosure. It is solely representative of selected embodiments of the present disclosure. All other embodiments obtained by those skilled in the art without exercising inventive effort based on the embodiments disclosed herein are also within the scope of protection of the present disclosure.

It should be noted that: similar reference numerals and letters represent similar elements in the accompanying drawings below. Accordingly, once an item is defined in one drawing, further definition and explanation thereof are not necessary in subsequent accompanying drawings.

It should be noted in the description of the present disclosure that the terms “up”, “down”, “inside”, “outside”, and other directional or positional relationships are based on the orientation or position shown in the accompanying drawings, or the customary orientation or position when using the product of the present disclosure. These terms are used for facilitating description and simplifying the description, and do not indicate or imply that the device or component referred to must have a specific orientation or be constructed and operated in a specific orientation. Therefore, they should not be understood as limiting the present disclosure.

In addition, the terms “first”, “second”, etc. are used only for purposes of distinguishing between descriptions, and should not be understood as indicating or implying relative importance.

It should be noted that, unless conflicting, features in the embodiments of the present disclosure may be combined with each other.

In one embodiment, the present disclosure provides an LED meteor light for 360-degree illumination, wherein the LED meteor light is a point control LED meteor light, and includes a plurality of LED meteor light units.

Each LED meteor light unit includes a transparent or semi-transparent tubular hood body.

Each LED meteor light unit is free of a PCB.

A head part and a tail part of each hood body includes a first waterproof cap and a second waterproof cap respectively.

A first bare conducting wire with certain rigidity and a second bare conducting wire with certain rigidity, parallel to each other, are at least arranged inside the hood body along a direction from the tail part to the head part of the hood body.

A plurality of LED luminous bodies are arranged in sequence inside the hood body along a direction of the first bare conducting wire with certain rigidity and the second bare conducting wire with certain rigidity.

Specifically, each LED luminous body is connected to a first connecting wire and a second connecting wire, the first connecting wire is connected to the first bare conducting wire with certain rigidity, and the second connecting wire is connected to the second bare conducting wire with certain rigidity.

For further reference, see specific examples in FIG. 1. The LED meteor light disclosed by the present disclosure is free of any PCB. In other words, the LED meteor light does not need a PCB, which not only reduces the cost, but facilitates 360-degree illumination; and each LED luminous body can realize 360-degree illumination and emit light towards the outside through the transparent or semi-transparent tubular hood body. Further, all necessary circuit elements are sealed inside the LED luminous bodies or beads, which prevents failures caused by the PCB, such as soldering shorts or false soldering, thus realizing a better structural design of the LED meteor light.

Figure 3:
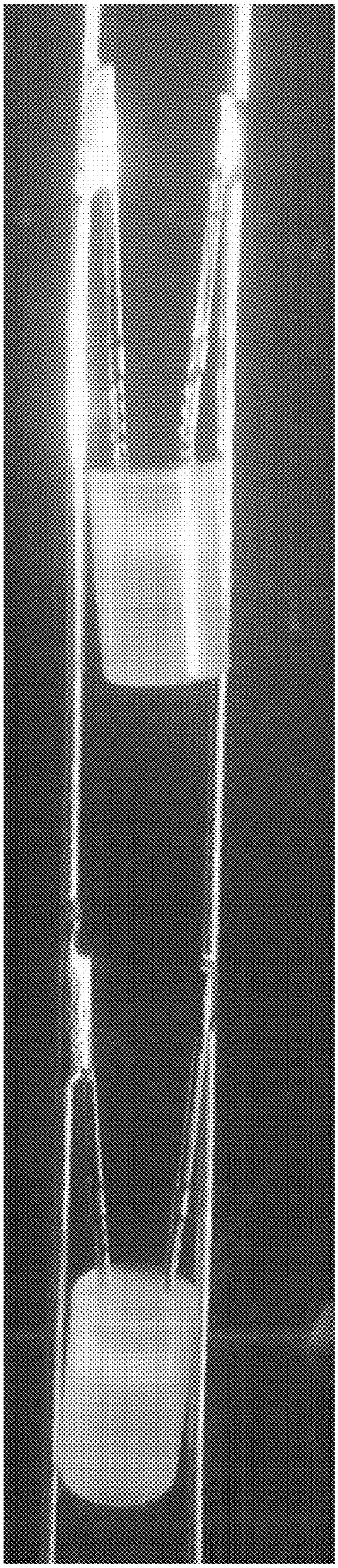
FIG. 3 is a schematic diagram of real objects inside a hood body in a two-wire point control LED meteor light provided by an embodiment of the present disclosure.

Exemplarily, FIG. 3 further illustrates a schematic diagram of real objects inside a hood body in a two-wire point control LED meteor light provided by an embodiment of the present disclosure.

In another embodiment, each LED luminous body includes an LED bead.

The LED bead is a point control bead and operation of the LED bead is controlled by at least two pins.

In another embodiment, the first bare conducting wire with certain rigidity and the second bare conducting wire with certain rigidity are in roughly equal lengths.

In another embodiment, when the LED bead is a two-wire point control bead, the inside of the hood body is provided with merely the first bare conducting wire with certain rigidity and the second bare conducting wire with certain rigidity.

It should be noted that, at the moment, the first bare conducting wire with certain rigidity and the second bare conducting wire with certain rigidity are used as power supply wires and can carry waves so as to transmit a control signal to each LED luminous body and the LED bead inside.

In another embodiment, when the LED bead is a three-wire point control bead, a third conducting wire is further arranged inside the hood body, wherein the third conducting wire is smaller in wire diameter than the first bare conducting wire with certain rigidity or the second bare conducting wire with certain rigidity.

In another embodiment, a wire diameter of the third conducting wire is determined on a basis of no significant impact on a visual effect of the corresponding LED meteor light unit and 360-degree illumination of the corresponding LED meteor light unit.

It can be understood that, the wire diameter of the third conducting wire may be very small and only needs to meet the most basic mechanical properties to avoid breaking the third conducting wire during shaking of the hood body.

In another embodiment, the third conducting wire is located between the first bare conducting wire with certain rigidity and the second bare conducting wire with certain rigidity.

In another embodiment, the first bare conducting wire with certain rigidity and the second bare conducting wire with certain rigidity are power supply wires.

Figure 2:
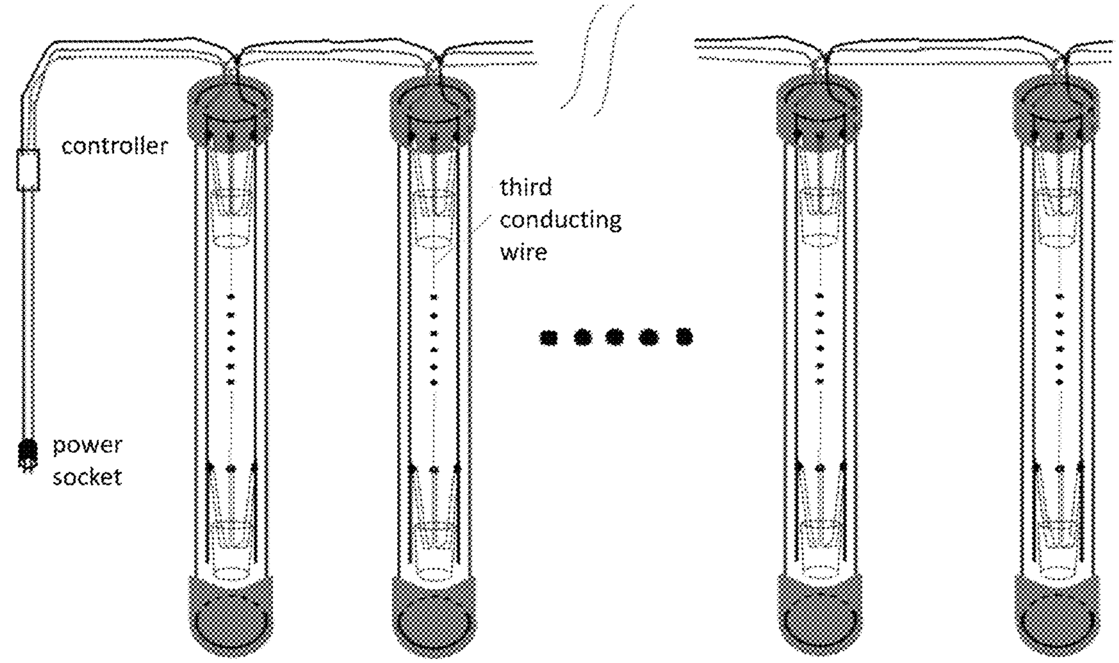
FIG. 2 is a schematic diagram of a three-wire point control LED meteor light provided by an embodiment of the present disclosure.

Referring to FIG. 2, in another embodiment, the third conducting wire is a signal wire, configured to transmit a signal to the bead in each LED luminous body to control a working status of the bead.

It should be noted that, at the moment, the LED bead in the LED luminous body is definitely a three-wire point control LED bead. Moreover, from the perspective of the third conducting wire, all LED luminous bodes in each LED meteor light unit may be in parallel connection. That is, all LED luminous bodies in each LED meteor light unit only receive a DIN signal and do not transmit any DOUT signal externally. The third conducting wire connects each LED luminous body in a bus-like manner. This is beneficial for maintaining the LED meteor light. For example, when a signal processing failure occurs in one or several LED luminous bodies inside the hood body, due to the bus-like connection of each LED luminous body by the third conducting wire, as long as the third conducting wire itself is not disconnected, the first bare conducting wire with certain rigidity and the second bare conducting wire with certain rigidity can still supply power normally to the remaining normal LED luminous bodies. Therefore, the remaining normal LED luminous bodies can still receive the DIN signal and operate normally. If maintenance or replacement of a faulty LED luminous body is needed, simply opening the hood body allows for easy maintenance operations.

Naturally, from the perspective of the third conducting wire, each LED luminous body in each LED meteor light unit may also follow a signal transmission method known as breakpoint continuation. That is, the LED luminous body preceding in the LED meteor light unit receives the DIN signal and externally transmits the DOUT signal to the LED emitter following it.

In another embodiment, the LED beads are in-line beads.

Figure 4:
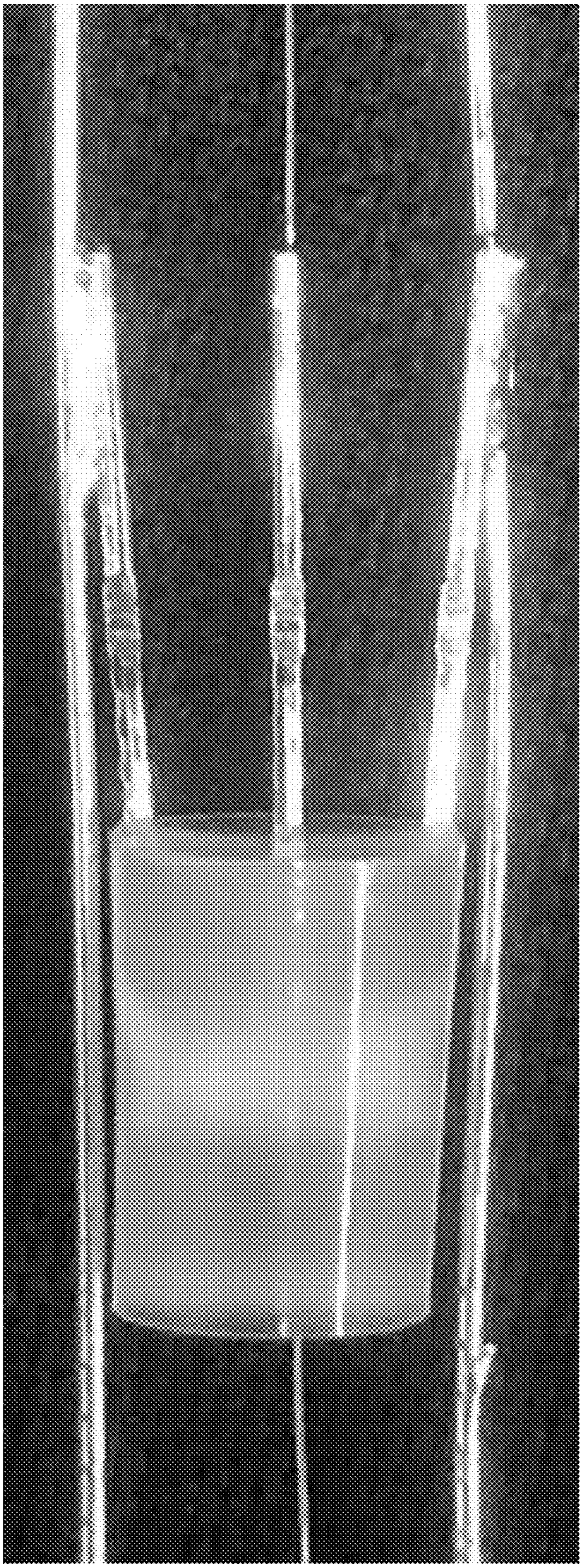
FIG. 4 is a schematic diagram of real objects inside a hood body in a three-wire point control LED meteor light provided by an embodiment of the present disclosure.

Exemplarily, FIG. 4 further illustrates a schematic diagram of real objects inside a hood body in a three-wire point control LED meteor light provided by an embodiment of the present disclosure. In combination with FIG. 3 and FIG. 4, it can be found that, the LED meteor light disclosed by the present disclosure is beneficial in that 360-degree illumination can be realized with the absence of PCBs, and that all bare conducting wires and the third conducting wire inside the hood body do not have a significant impact on the visual effect. It can also be understood that the wire diameters and rigidity of the first bare conducting wire with certain rigidity and the second bare conducting wire with certain rigidity need to satisfy the following two restricting conditions: the bare conducting wires should not only support all the plurality of LED luminous bodies, but also exert no significant impact on the visual effect of the LED meteor light. The wire diameter and rigidity of the third conducting wire need to satisfy the following restricting conditions: the wire diameter should be as thin as possible, so that the conducting wire does not have a significant impact on the visual effect of the LED meteor light, and even if the hood body swings in non-harsh weather conditions, the third conducting wire should not break.

In addition, in another embodiment, the present disclosure further discloses a manufacturing method for an LED meteor light for 360-degree illumination. The method includes the following steps:

a first bare conducting wire with certain rigidity and a second bare conducting wire with certain rigidity which are parallel to each other are arranged;

a plurality of LED luminous bodies are arranged in sequence along a direction of the first bare conducting wire with certain rigidity and the second bare conducting wire with certain rigidity, and each LED luminous body is connected to the first bare conducting wire with certain rigidity through a first connecting wire, and each LED luminous body is connected to the second bare conducting wire with certain rigidity through a second connecting wire.

In another embodiment, the method further includes the following steps:

a hood body is arranged, and the plurality of LED luminous bodies, the first bare conducting wire with certain rigidity, the second bare conducting wire with certain rigidity, the first connecting wire and the second connecting wire are sleeved with the hood body.

In another embodiment, the method further includes the following steps:

a first waterproof cap and a second waterproof cap are respectively arranged on a head part and a tail part of the hood body.

In another embodiment, the method further includes the following steps:

the first bare conducting wire with certain rigidity and the second bare conducting wire with certain rigidity inside the hood body are connected to two power supply wires outside the hood body through the second waterproof cap on the tail part of the hood body.

In another embodiment, the method further includes the following steps:

when the LED bead is a three-wire point control bead, a third conducting wire is arranged inside the hood body, wherein the third conducting wire is smaller in wire diameter than the first bare conducting wire with certain rigidity or the second bare conducting wire with certain rigidity.

The third conducting wire is a signal wire, configured to transmit a signal to the bead in each LED luminous body to control a working status of the bead.

The above description is only specific embodiments of the present disclosure and the scope of protection of the present disclosure is not limited thereto. Any changes or substitutions that can be easily conceived by those skilled in the art within the technical scope disclosed in the present disclosure should be encompassed within the scope of protection of the present disclosure. Therefore, the scope of protection of the present disclosure should be determined by the scope defined in the claims.

The invention claimed is:

1. An LED meteor light for 360-degree illumination, wherein the LED meteor light is a point control LED meteor light, and comprises a plurality of LED meteor light units, wherein each LED meteor light unit comprises a transparent or semi-transparent tubular hood body, each LED meteor light unit is free of a PCB, a head part and a tail part of each hood body comprise a first waterproof cap and a second waterproof cap respectively, a first bare conducting wire with certain rigidity and a second bare conducting wire with certain rigidity, parallel to each other, are at least arranged inside the hood body along a direction from the tail part to the head part of the hood body, and a plurality of LED luminous bodies are arranged in sequence inside the hood body along a direction of the first bare conducting wire with certain rigidity and the second bare conducting wire with certain rigidity, wherein each LED luminous body is connected to a first connecting wire and a second connecting wire, the first connecting wire is connected to the first bare conducting wire with certain rigidity, and the second connecting wire is connected to the second bare conducting wire with certain rigidity.

2. The LED meteor light according to claim 1, wherein, preferably, each LED luminous body comprises an LED bead, and the LED bead is a point control bead and operation of the LED bead is controlled by at least two pins.

3. The LED meteor light according to claim 1, wherein, the first bare conducting wire with certain rigidity and the second bare conducting wire with certain rigidity are in roughly equal lengths.

4. The LED meteor light according to claim 2, wherein when the LED bead is a two-wire point control bead, the inside of the hood body is provided with merely the first bare conducting wire with certain rigidity and the second bare conducting wire with certain rigidity.

5. The LED meteor light according to claim 2, wherein when the LED bead is a three-wire point control bead, a third conducting wire is further arranged inside the hood body, wherein the third conducting wire is smaller in wire diameter than the first bare conducting wire with certain rigidity or the second bare conducting wire with certain rigidity.

6. The LED meteor light according to claim 5, wherein a wire diameter of the third conducting wire is determined on a basis of no significant impact on a visual effect of the corresponding LED meteor light unit and 360-degree illumination of the corresponding LED meteor light unit.

7. The LED meteor light according to claim 5, wherein the third conducting wire is located between the first bare conducting wire with certain rigidity and the second bare conducting wire with certain rigidity.

8. The LED meteor light according to claim 1, wherein the first bare conducting wire with certain rigidity and the second bare conducting wire with certain rigidity are power supply wires.

9. The LED meteor light according to claim 5, wherein the third conducting wire is a signal wire, configured to transmit a signal to the bead in each LED luminous body to control a working status of the bead.

10. A manufacturing method for an LED meteor light, used for manufacturing the LED meteor light for 360-degree illumination according to claim 1.

* * * * *